US009764651B2

United States Patent
Moon

(10) Patent No.: US 9,764,651 B2
(45) Date of Patent: Sep. 19, 2017

(54) ELECTRIC VEHICLE CHARGER

(71) Applicant: LSIS CO., LTD., Anyang-si, Gyeonggi-do (KR)

(72) Inventor: Ki Young Moon, Cheonan-si (KR)

(73) Assignee: LSIS CO., LTD., Anyang-si, Gyeonggi-do (KR)

(*) Notice: Subject to any disclaimer, the term of this patent is extended or adjusted under 35 U.S.C. 154(b) by 183 days.

(21) Appl. No.: 14/334,489

(22) Filed: Jul. 17, 2014

(65) Prior Publication Data

US 2015/0151643 A1    Jun. 4, 2015

(30) Foreign Application Priority Data

Dec. 4, 2013 (KR) ......................... 10-2013-0150235

(51) Int. Cl.
*H05K 5/06* (2006.01)
*B60L 11/18* (2006.01)

(52) U.S. Cl.
CPC ....... *B60L 11/1818* (2013.01); *Y02T 10/7005* (2013.01); *Y02T 10/7072* (2013.01); *Y02T 90/14* (2013.01)

(58) Field of Classification Search
CPC .... H02G 15/013; H02G 3/088; H02G 15/007; H02G 3/083; H02G 3/22; H02G 3/0616; H02G 3/18; Y02T 90/14; B60L 2230/12; B60L 11/1818; G02B 6/4441; G02B 6/4446; G02B 6/3897; G02B 6/4471; H05K 5/061; H05K 5/0052; H05K 5/0247; H05K 5/069; H01R 13/6392; H01R 31/06; H01R 13/5202; H01R 13/5205; H01R 2201/26
(Continued)

(56) References Cited

U.S. PATENT DOCUMENTS 5,845,803 A * 12/1998 Saito ...................... H05K 5/061
                                                                 220/222
7,186,929 B2 * 3/2007 Cox ....................... H02G 3/088
                                                                 16/2.1
(Continued)

FOREIGN PATENT DOCUMENTS

CN        1131345       9/1996
DE        19704532      8/1998
(Continued)

OTHER PUBLICATIONS

European Patent Office Application Serial No. 14178097.3, Search Report dated Apr. 8, 2015, 5 pages.
(Continued)

*Primary Examiner* — James Wu
(74) *Attorney, Agent, or Firm* — Lee Hong Degerman Kang & Waimey

(57) ABSTRACT

Provided is an electric vehicle charger. The electric vehicle charger includes a lower case including a front partition wall having a cable penetration cutoff part that is cut to pass in forward and backward directions, an upper case including a front partition wall having a cable penetration cutoff part that is cut to pass in forward and backward directions, a sealing part having at least one portion disposed between the upper case and the lower case, and a cable passing though a portion of the upper case and a portion of the lower case, the cable being coupled between the upper case and the lower case.

5 Claims, 4 Drawing Sheets

(58) Field of Classification Search
USPC ....... 174/50.5, 50.52, 65 R, 76, 77 R, 138 F, 174/520, 650, 656, 658, 668; 220/3.92, 220/3.94, 4.02; 439/345, 483, 595, 660; 385/92, 94, 135, 136, 137, 139
See application file for complete search history.

(56) References Cited

U.S. PATENT DOCUMENTS

| | | | | |
|---|---|---|---|---|
| 2003/0095740 | A1* | 5/2003 | Wu | G02B 6/3582 385/18 |
| 2005/0079749 | A1* | 4/2005 | Schmidt | H01R 13/5205 439/275 |
| 2005/0253343 | A1 | 11/2005 | Hampton | |
| 2007/0215614 | A1* | 9/2007 | Matsui | H05K 5/0069 220/3.2 |
| 2008/0233783 | A1* | 9/2008 | Jacobson | H01R 13/5205 439/271 |
| 2013/0194735 | A1 | 8/2013 | Kajiya et al. | |

FOREIGN PATENT DOCUMENTS

| | | |
|---|---|---|
| EP | 1633015 | 3/2006 |
| EP | 2413165 | 2/2012 |
| JP | 4-72424 | 6/1992 |
| JP | 5-46071 | 6/1993 |
| JP | 06-245394 | 9/1994 |
| JP | 08-213058 | 8/1996 |
| JP | 10-173365 | 6/1998 |
| JP | 10-242664 | 9/1998 |
| JP | 11-299058 | 10/1999 |
| JP | 2000-277934 | 10/2000 |
| JP | 2002-369334 | 12/2002 |
| JP | 2003-087944 | 3/2003 |
| JP | 2008-227464 | 9/2008 |
| JP | 2009-240053 | 10/2009 |
| JP | 2014-054162 | 3/2014 |
| KR | 10-2013-0057054 | 5/2013 |

OTHER PUBLICATIONS

Japan Patent Office Application Serial No. 2014-159524, Office Action dated May 29, 2015, 4 pages.
Korean Intellectual Property Office Application Serial No. 10-2013-0150235, Office Action dated Jan. 15, 2015, 4 pages.
Korean Intellectual Property Office Application Serial No. 10-2013-0150235, Notice of Allowance dated Jul. 27, 2015, 2 pages.
The State Intellectual Property Office of the People's Republic of China Application Serial No. 201410648340.5, Office Action dated Jul. 19, 2016, 7 pages.

* cited by examiner

ELECTRIC VEHICLE CHARGER

CROSS-REFERENCE TO RELATED APPLICATIONS

Pursuant to 35 U.S.C. §119(a), this application claims the benefit of earlier filing date and right of priority to Korean Patent Application No. 10-2013-0150235, filed on Dec. 4, 2013, the contents of which are hereby incorporated by reference herein in its entirety.

BACKGROUND

The present disclosure relates to an electric vehicle charger, and more particularly, to an electric vehicle charger having an improved waterproof structure.

Electric vehicle chargers may be used in the outside. As a result, electric vehicle chargers may be stably operated under a weather condition such as rain, wind, or snow. Thus, a waterproof function has to be essentially provided to the electric vehicle chargers.

FIGS. 1 and 2 are views of am electric vehicle charger according to a related art. FIG. 1 is a perspective view of a portion of the electric vehicle charger according to the related art, and FIG. 2 is a side cross-sectional view of a portion of the electric vehicle charger according to the related art.

Referring to FIGS. 1 and 2, the electric vehicle charger according to the related art includes a lower case 11, an upper case 12, and a cable 30 that passes through and is coupled to the upper and lower cases 12 and 11.

The cable 30 includes a wire 31 including an electric line for charging and a signal line. The cable 30 is connected to a circuit board (not shown) that is built in the upper and lower cases 12 and 11. For reference, various electric components that are needed for operating the electric vehicle charger may be mounted on the circuit board (not shown).

In this structure, a portion at which the upper case 12 is coupled to the lower case 11 and a portion at which the upper and lower cases 11 and 12 are coupled to the cable 30 have to be waterproofed.

Thus, a main sealing member 21 and a mount sealing member 22 may be disposed on a portion at which the upper and lower case are folded.

Also, when a bushing 32 is coupled to the cable 30, the bushing 32 is inserted into a bushing insertion hole 13 defined in the lower case 11. Here, the bushing insertion groove 13 may have an inner diameter less than an outer diameter of the bushing 32. Also, the bushing 32 may be press-fitted into the lower case 11. If the bushing 32 and the lower case 11 are not completely sealed therebetween, it may be difficult to achieve a waterproof function, or foreign substances may be introduced.

However, in case of the above-described structure, when a metal is provided on the cable 30, for example, or a metal ring formed of a metal material is hung on an end of the wire 31, it may be difficult to allow the cable, on which the metal ring is attached, to pass through the bushing insertion hole 13 defined in the case 11, thereby inserting the cable into the bushing insertion hole 13.

Also, since the sealing members 21 and 22 for sealing a space between the upper case 12 and the lower case 11 are separately provided, it may be difficult to perform an assembly process in which the sealing members 21 and 22 are assembled with each other after moving to exact locations.

SUMMARY

Embodiments provide an electric vehicle charger that is easily assembled and improved in sealing effect.

In one embodiment, an electric vehicle charger includes: a lower case including a front partition wall having a cable penetration cutoff part that is cut to pass in forward and backward directions; an upper case including a front partition wall having a cable penetration cutoff part that is cut to pass in forward and backward directions; a sealing part having at least one portion disposed between the upper case and the lower case; and a cable passing though a portion of the upper case and a portion of the lower case, the cable being coupled between the upper case and the lower case, wherein the sealing part includes: a partition wall blocking part having at least one portion that is disposed at a front side of the front partition wall of the upper case and the front partition wall of the lower case; and a main sealing part connected to the partition wall blocking part to extend along an upper end of the upper case or a lower end of the lower case, wherein the partition wall blocking part and the main sealing part are integrated with each other.

The sealing part may further include: a connection part extending inward from the main sealing part; and a mounting sealing part having a ring shape, the mounting sealing part being disposed on an inner end of the connection part, wherein the connection part and the mounting sealing part may be integrated with the partition wall blocking part and the main sealing part.

The partition wall blocking part may further include: a plate disposed at the front side of the front partition wall of the upper case and the front partition wall of the lower case, the plate having a cable through hole passing therethrough in forward and backward directions; and a cylindrical part disposed at a rear side of the plate, wherein the cylindrical part may have a hollow cylindrical shape with front and rear ends opened, and the front end of the cylindrical part may communicate with the cable through hole of the plate.

A support protruding upward from a bottom surface of the lower case to the cylindrical part may be disposed on the lower case.

At least one of the front partition wall of the upper case and the front partition wall of the lower case may be stepped inward, and the plate may be disposed on the stepped portion.

The lower case may include a case protrusion spaced forward from the front partition wall to protrude upward, and a first sealing groove that is recessed upward to insert the case protrusion therein may be defined in a lower end of the plate.

The upper case may include a case protrusion spaced forward from the front partition wall to protrude downward, and a first sealing groove that is recessed downward to insert the case protrusion therein may be defined in an upper end of the plate.

The sealing part may further include a first sealing protrusion disposed spaced at a rear side of the plate, a second sealing groove may be defined between the plate and the first sealing protrusion, and a portion of the front partition wall of the lower case and a portion of the front partition wall of the upper case may be fitted into the second sealing groove.

A case groove that is recessed downward may be defined in an upper end of the front partition wall of the lower case, and the sealing part may include a second sealing protrusion disposed spaced at the rear side of the plate, the second sealing protrusion being inserted into the case groove.

A case groove that is recessed upward may be define din a lower end of the front partition wall of the upper case, and the sealing part may include a second sealing protrusion disposed spaced at the rear side of the plate, the second sealing protrusion being inserted into the case groove.

A mounting part protruding upward and having an upper end that is recessed downward in a ring shape may be disposed on the lower case, and the mounting sealing part may be disposed on an upper end of the lower mounting part.

The details of one or more embodiments are set forth in the accompanying drawings and the description below. Other features will be apparent from the description and drawings, and from the claims.

DETAILED DESCRIPTION OF THE EMBODIMENTS

Hereinafter, an electric vehicle charger according to an embodiment will be described with reference to the accompanying drawings.

Figure 1:
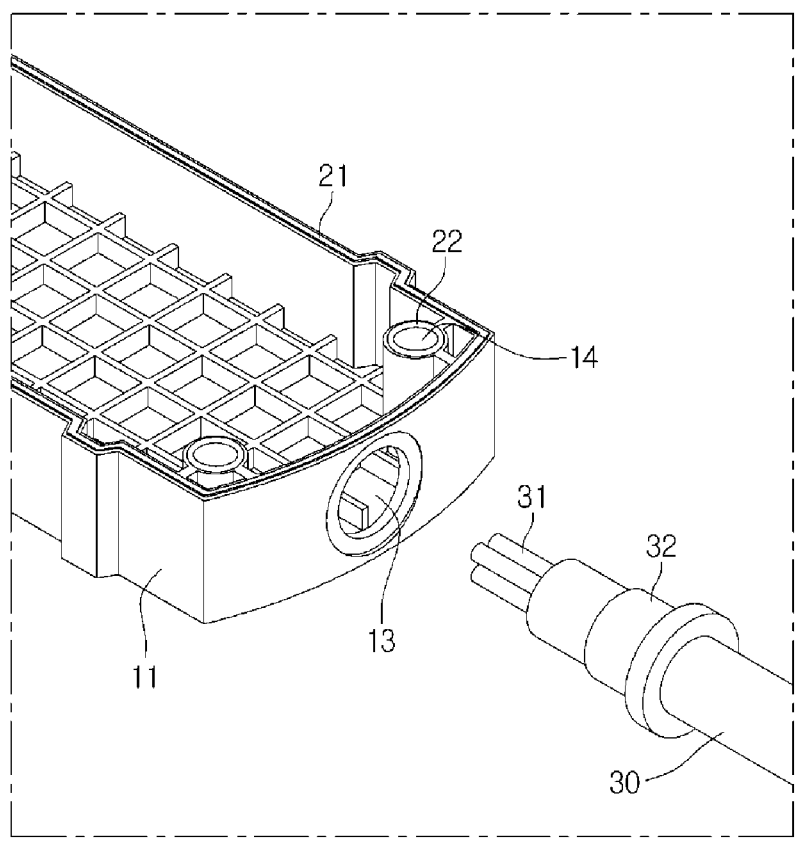
FIG. 1 is a view of a portion of an electric vehicle charger according to a related art.
Figure 2:
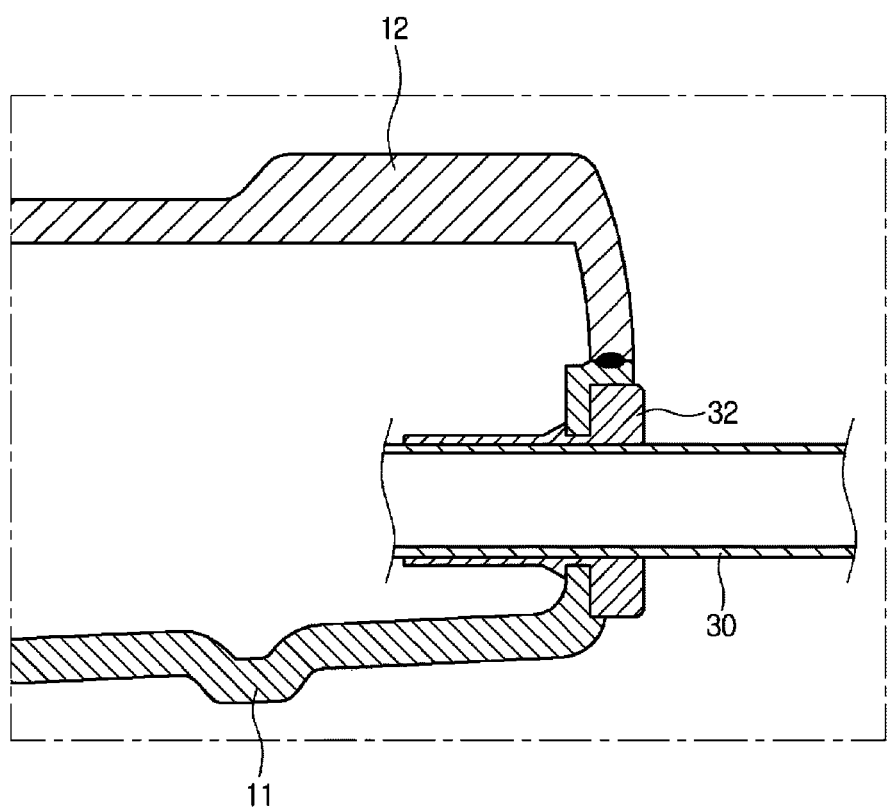
FIG. 2 is a side cross-sectional view of a portion of the electric vehicle charger according to the related art.
Figure 3:
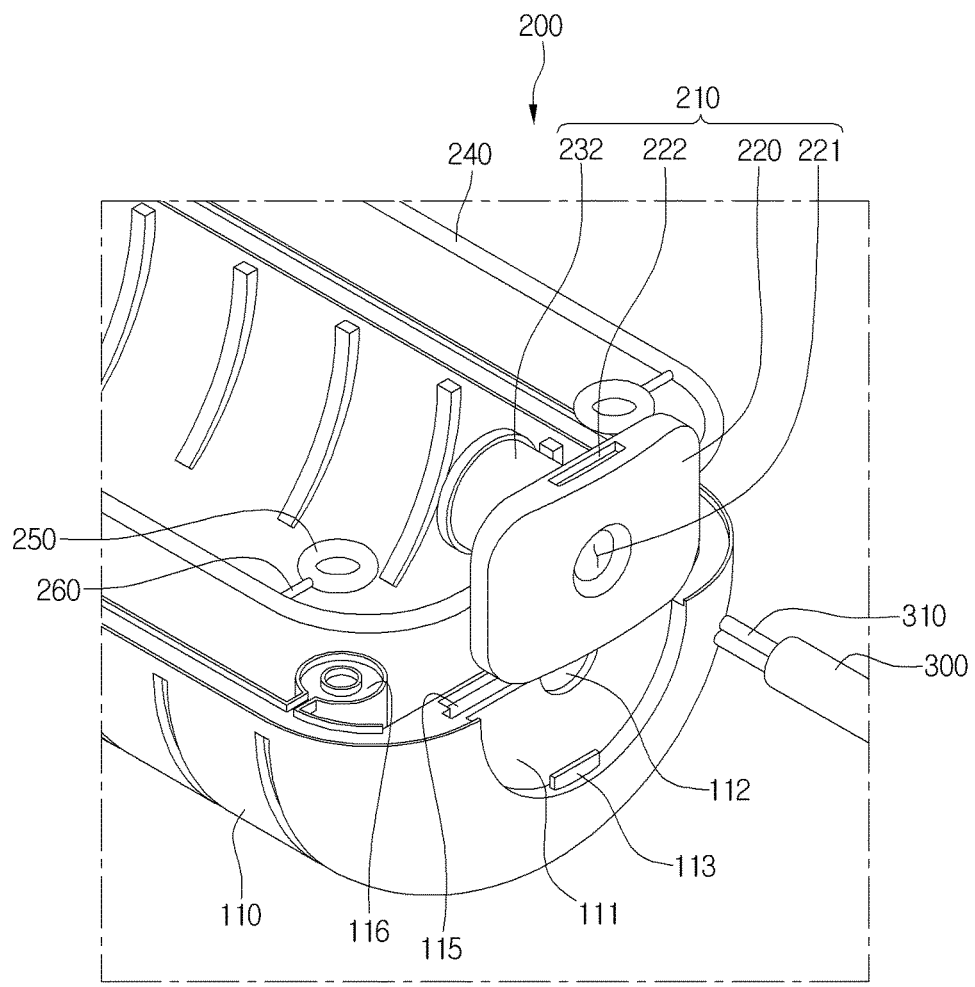
FIG. 3 is a perspective view of a portion of an electric vehicle charger according to an embodiment.
Figure 4:
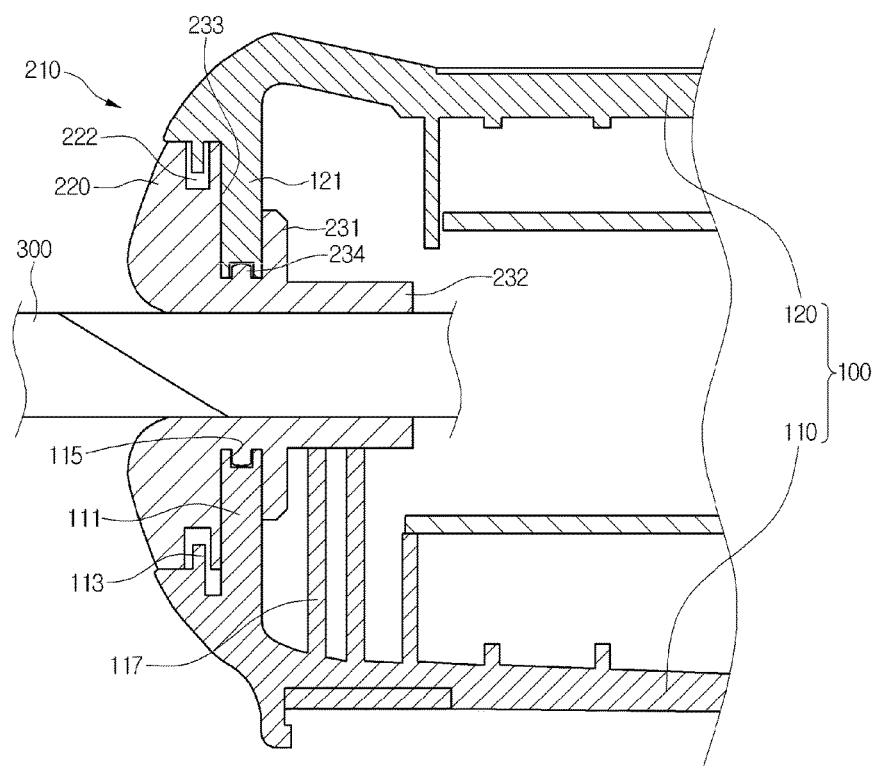
FIG. 4 is a side cross-sectional view of a portion of the electric vehicle charger according to an embodiment.

FIG. 3 is a perspective view of a portion of an electric vehicle charger according to an embodiment, and FIG. 4 is a side cross-sectional view of a portion of the electric vehicle charger according to an embodiment.

Referring to FIGS. 3 and 4, an electric vehicle charger according to an embodiment includes a case 100, a sealing part 200 coupled to the case 100 to seal the case 100, and a cable 300 inserted into the case 100.

The case 100 includes a lower case 110 and an upper case 120 coupled to an upper portion of the lower case 110. The upper case has an edge extending upward, and the upper case 120 has an edge extending downward. Thus, when the lower case 110 and the upper case 120 are coupled to each other, a space in which various electrical components are mounted may be defined between the upper and lower cases 110 and 120.

The lower case 110 is provided with a front partition wall 111. A portion of a front sidewall of the lower case 110 is stepped inward to form the front partition wall 111. Thus, the front partition wall 111 may extend upward in a state where the front partition wall 111 is stepped inward from other portions.

A cable penetration cutoff part 112 that is penetrated forward and backward is defined in a center of an upper end of the front partition wall 111. The cable penetration cutoff part 112 may have a semicircular shape when viewed in front and rear directions.

For reference, in the descriptions of the current embodiment, the front and rear directions may represent a direction in which the cable is inserted, i.e., the cable extends. Also, the front direction may represent an outer direction of the case with respect to the front partition wall 111, and the rear direction may represent an inner direction of the case with respect to the front partition wall 111.

Also, an upward direction may represent a direction in which the upper case 120 is disposed, and the downward direction may represent a direction in which the lower case 110 is disposed.

Also, the left and right directions may represent a direction in which the front and rear directions cross the upward and downward directions, and more particularly, a direction that is perpendicular to the front and rear directions and the upward and downward directions.

A case protrusion 113 protruding upward from the lower side is disposed outside the front partition wall 111. The case protrusion 113 may protrude at a height less than that of the front partition wall 111 from a front portion of the front partition wall 111 and be disposed at a center in the horizontal direction of the front partition wall 111. The case protrusion 113 extends upward with a predetermined left/right width.

Since the case protrusion 113 is disposed on the front portion of the front partition wall 111, a space may be defined between the front partition wall 111 and the case protrusion 113. A portion of a rear portion of a plate 222 that will be described below may be inserted into the space.

A case groove 115 that is recessed downward is defined in an upper end of the front partition wall 111. The case groove 115 may be defined at a predetermined center position in the forward and backward directions of the front partition wall 111 and be recessed downward by a predetermined depth. Thus, the case groove 115 may have a predetermined width in the forward and backward directions. Also, the case groove 115 may lengthily extend in the left and right directions.

A support 117 extending upward from a bottom surface of the lower case 110 is disposed at a rear side of the front partition wall 111. The support 117 may support a cable 300, that will be described below, upward from a lower side of the cable 300. The support 117 may be disposed spaced a predetermined distance backward from the front partition wall 111.

A mounting part 116 may be disposed inside the front partition wall 110, i.e., at the rear side of the front partition wall 110. As described above, an upper end of the mounting part 116 may be recessed downward in a ring shape so that a mounting sealing part 250 is disposed therein.

The front partition wall 111, the cable penetration cutoff part 112, the case protrusion 113, the case groove 115, and the mounting part 116, which are provided at the lower case 110 may also be symmetrically provided at the upper case 120. Thus, a front partition wall, a cable penetration cutoff part, a case protrusion, a case groove, and a mounting part may be provided at the upper case 120. That is, all parts of the upper and lower cases 120 and 110 may be symmetrically provided in a vertical direction. However, this may not represent that the upper and lower cases 120 and 110 include the same components. For example, only portions of the upper case 120 may be symmetrically provided in/on the lower case 110. Alternatively, a component that is provided at the lower case 110 may be additionally provided at the upper case 120.

Here, since a cable penetration cutoff part that has a semicircular shape and is symmetrical to that cable penetration cutoff part 112 that has the semicircular shape and is defined in the front partition wall 111 is provided in the upper case 120, the cable penetration cutoff part having the semicircular shape and the cable penetration cutoff part 112 having the semicircular shape are coupled to form a cable penetration cutoff part having a circular shape. The cable 300 passes through the cable penetration cutoff part.

The sealing part 200 includes a partition wall blocking part 210, a mean sealing part 240 having both ends coupled to both sides of the partition wall blocking part 210, and a mount sealing part 250 connected to the main sealing part 240.

The partition wall blocking part 210 includes a plate 220, a first sealing protrusion 231 disposed at a rear side of the plate 220, and a cylindrical part 232 extending backward from a center of the plate 220.

The plate 220 has a plate shape extending horizontally and vertically. Also, the plate 220 has a predetermined thickness in the front and rear directions. The plate 220 may be disposed at a front side of the front partition walls 111 and 121 of the lower and upper cases 110 and 120. That is, the plate 220 is disposed outside the two front partition walls 111 and 121. As described above, one or all of the front partition walls 121 and 111 of the upper and lower cases 120 and 110 may be stepped inward. Here, the plate 220 may be disposed on the stepped portion.

A cable through hole 221 is defined in a center of the plate 220. Here, the cable through hole 221 may pass through the plate 220.

A first sealing groove 222 vertically recessed toward the center of the plate 220 may be defined in each of upper and lower ends of the plate 220. The first sealing groove 222 may be vertically provided in a pair. The first sealing groove 222 defined in the upper end of the plate 220 may be recessed downward, and the first sealing groove 222 defined in the lower end of the plate 220 may be recessed upward. The case protrusion 113 of the lower case 110 is inserted into the first sealing groove 222 defined in the lower end of the plate 220, and the case protrusion of the upper case 120 is inserted into the first sealing groove 222 defined in the upper end of the plate 220.

The first sealing protrusion 231 is disposed at a rear side of the first plate 220. The first sealing protrusion 231 is disposed spaced forward from the plate 220 to protrude outward from the cylindrical part 232 that will be described later.

Thus, a second sealing groove 233 is defined between the first sealing protrusion 231 and the plate 220. A portion of an upper portion of the front partition wall 111 of the lower case 110 and a portion of a lower portion of the front partition wall of the upper case 120 are inserted into the second sealing groove 233.

Also, a second sealing protrusion 234 protruding outward from the center is disposed in the second sealing groove 233. The second sealing protrusion 234 is inserted into the case groove 115 defined in the upper end of the front partition wall 111 of the lower case 110 and the case groove defined in the lower end of the front partition wall of the upper case 120.

The cylindrical part 232 extends backward from the center of the plate 220. That is, the cylindrical part 232 extends from a back surface of the plate 220 to the inside of the case 100. The cylindrical part 232 has a hollow cylindrical shape having opened front and rear ends. The hollow portion of the cylindrical part 232 may communicate with the cable penetration cutoff part 112 defined in the center of the plate 220.

The main sealing part 240 is connected to the partition wall blocking part and inserted between the upper case and the lower case to extend along the portion at which the upper and lower cases contact each other. The main sealing part 240 extends along the edges of the lower end of the upper case 120 and the upper end of the lower case 110.

Thus, the main sealing part 240 may have a shape corresponding to that of the portion at which the upper case 120 and the lower case 110 contact each other, i.e., the same shape as the portion at which the upper case 120 and the lower case 110 contact each other.

The main sealing part 240 may extend in a looped curve shape along the lower end of the upper case 120 and the upper end of the lower case 110. Both ends of the main sealing part 240 may be coupled to both sides of the partition wall blocking part 210. Here, both left and right ends of the main sealing part 240 may be coupled to both left and right ends of the plate 220. Alternatively, both left and right ends of the main sealing part 240 may be coupled to both left and right sides of the cylindrical part 232.

The mounting sealing part 250 may have an approximately ring shape. The mounting sealing part 250 may be connected to the main sealing part 240 through a connection part 260. Thus, the mounting sealing part 250 having the ring shape may be disposed on an inner end of the connection part 260 that extends inward from one position of the main sealing part 240. The mounting sealing part 250 is placed on an upper portion of the mounting part 116 of the lower case 110. As described above, the upper end of the mounting part 116 may be recessed downward in the ring shape so that the mounting sealing part 250 is disposed therein. A mounting part (not shown) having a shape corresponding to the mounting part 116 of the lower case 110 may be disposed on the upper case 120 at a position corresponding to that of the mounting part 116 of the lower case 110. Thus, the mounting sealing part 250 may be disposed between the mounting part of the upper case 120 and the mounting part 116 of the lower case 110.

The sealing part 200 may be integrally provided. That is, the partition wall blocking part 210, the main sealing part 240, the mounting sealing part 250, and the connection part 260 may be integrated with each other. Also, the first sealing protrusion 231 may also be integrated.

Here, the plate 220 and the cylindrical part 232 constituting the partition wall blocking part 210 may be integrated with each other. Also, the first sealing protrusion 231 and the second sealing protrusion 234 may be integrated with the plate 220 and the cylindrical part 232.

The cable 300 includes a wire 310 including an electric line for charging and a signal line. The cable 30 is connected to a circuit substrate (not shown) that is built in the upper and lower cases 120 and 110. For reference, various electric components that are needed for operating the electric vehicle charger may be mounted on the circuit board (not shown).

Due to the above-described structure, since the sealing part 200 is integrally provided, the electric vehicle charger may be easily assembled. Since the partition wall blocking part 210, the main sealing part 240, and the mounting sealing part 250 are integrally provided, the process in which each component has to be placed in position one by one before the lower case 110 and the upper 120 are assembled with each other in the related art may be omitted.

On the other hand, since the lower case 110 and the upper case 120 are assembled with each other in a state where one component is disposed between the lower case 110 and the upper case 120 to assemble the electric vehicle charger, the assembling accurate may increases to improve the sealing effect, and also, the assembly process may be easily performed.

Also, since the case 110 and the plate 220 include the plurality of protrusions and grooves, which are engaged with each other and inserted, the sealing effect may be improved, and also, the assembly process may be simplified.

According to the embodiments, the electric vehicle charger may be easily assembled and improved in sealing effect.

The above-disclosed subject matter is to be considered illustrative, and not restrictive, and the appended claims are intended to cover all such modifications, enhancements, and other embodiments, which fall within the true spirit and scope of the present disclosure.

Thus, the exemplary embodiments should be considered in descriptive sense only and not for purposes of limitation, and the technical idea is not limited in range by the embodiments.

Therefore, the scope of the invention is defined not by the detailed description of the invention but by the appended claims, and all differences within the scope will be construed as being included in the present disclosure.

What is claimed is:

1. An electric vehicle charger comprising:
   a lower case comprising a first case protrusion, a first case groove, and a first front partition wall that is spaced at a distance from the first case protrusion, wherein the first case protrusion and the first front partition wall protrudes toward a center axis of a partition wall blocking part, and the first case groove is recessed toward a direction away from the center axis of the partition wall blocking part and is formed in the first front partition wall;
   an upper case comprising a second case protrusion, a second case groove, and a second front partition wall that is spaced at a distance from the second case protrusion, wherein the second case protrusion and the second front partition wall protrudes toward the center axis of a partition wall blocking part, and the second case groove is recessed toward the direction away from the center axis of the partition wall blocking part and is formed in the second front partition wall;
   a sealing part having at least one portion disposed between the upper case and the lower case; and
   a cable coupled between the upper case and the lower case,
   wherein the sealing part comprises:
   the partition wall blocking part; and
   a main sealing part connected to the partition wall blocking part,
   wherein the partition wall blocking part comprises:
   a cylindrical part having a through hole for insertion of the cable;
   a plate protruding toward a direction away from the center axis of the partition wall blocking part;
   a first sealing protrusion disposed spaced at a rear side of the plate and extending toward the direction away from the center axis of the partition wall blocking part;
   a first sealing groove separately formed in each of an upper end of the plate and a lower end of the plate, wherein the first sealing groove is recessed toward the center axis of the partition wall blocking part to respectively receive the first case protrusion of the lower case and the second case protrusion of the upper case;
   a second sealing groove disposed between the plate and the first sealing protrusion and recessed toward the center axis of the partition wall blocking part to insert the first front partition wall of the lower case and the second front partition wall of the upper case; and
   a second sealing protrusion disposed within the second sealing groove, the second sealing protrusion being inserted into the first and second case grooves.

2. The electric vehicle charger according to claim 1, wherein the sealing part further comprises:
   a connection part extending inward from the main sealing part; and
   a mounting sealing part having a ring shape, the mounting sealing part being disposed on an inner end of the connection part,
   wherein the connection part and the mounting sealing part are integrated with the partition wall blocking part and the main sealing part.

3. The electric vehicle charger according to claim 1, wherein the cylindrical part has a hollow cylindrical shape with front and rear ends opened, and
   the front end of the cylindrical part communicates with a through hole of the plate.

4. The electric vehicle charger according to claim 3, wherein a support protruding upward from a bottom surface of the lower case to the cylindrical part is disposed on the lower case.

5. The electric vehicle charger according to claim 2, wherein a lower mounting part protruding upward and having an upper end that is recessed downward in a ring shape is disposed on the lower case, and
   the mounting sealing part is disposed on an upper end of the lower mounting part.

* * * * *